(12) United States Patent
Gupta et al.

(10) Patent No.: US 12,373,460 B2
(45) Date of Patent: Jul. 29, 2025

(54) ROLE DATA SYNCHRONIZATION USING A SINGLE LOGICAL UNIT OF WORK

(71) Applicant: SAP SE, Walldorf (DE)

(72) Inventors: Gopal Prasad Gupta, Bengaluru (IN); Shwetha H S, Bengaluru (IN); Arindam Bhar, Bengaluru (IN); Alfred Dewald, Brammental (DE); Priyanka Gupta, Bengaluru (IN); Manish Verma, Lachhmangarh (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/344,032

(22) Filed: Jun. 29, 2023

(65) Prior Publication Data

US 2025/0005037 A1    Jan. 2, 2025

(51) Int. Cl.
G06F 16/27         (2019.01)
G06F 16/23         (2019.01)

(52) U.S. Cl.
CPC .......... *G06F 16/27* (2019.01); *G06F 16/2365* (2019.01)

(58) Field of Classification Search
CPC .............................. G06F 16/27; G06F 16/2365
See application file for complete search history.

(56) References Cited

U.S. PATENT DOCUMENTS

| | | | | |
|---|---|---|---|---|
| 6,453,353 B1 * | 9/2002 | Win | ...................... | H04L 63/105 |
| | | | | 726/8 |
| 7,590,972 B2 * | 9/2009 | Axelrod | ................. | G06Q 99/00 |
| | | | | 707/999.009 |
| 7,676,498 B2 * | 3/2010 | England | ............. | G06F 21/6281 |
| | | | | 707/999.107 |
| 8,805,774 B2 * | 8/2014 | Boyer | ................... | G06F 16/907 |
| | | | | 707/608 |
| 9,349,022 B2 * | 5/2016 | Povalyayev | .......... | H04L 63/102 |
| 2006/0206406 A1 * | 9/2006 | Rau | ........................ | G06Q 40/04 |
| | | | | 705/37 |
| 2017/0371942 A1 * | 12/2017 | Baumgaertel | ......... | G06F 16/215 |
| 2019/0080379 A1 * | 3/2019 | Dallahan | ............ | G06Q 30/0603 |
| 2020/0344233 A1 * | 10/2020 | Lai | ..................... | G06Q 20/4014 |

* cited by examiner

*Primary Examiner* — Kris E Mackes
(74) *Attorney, Agent, or Firm* — Mintz Levin Cohn Ferris Glovsky and Popeo, P.C.

(57) ABSTRACT

A method, a system, and computer program product for customer and vendor role data synchronization using a single logical unit of work are provided. A request to create a new data set, for a user is processed. The new data set includes general data compatible with a plurality of roles. A selection of a first role to customize the new data set is received. It is determined that the user is associated with a second role. An integration process including a validation of the new data set is triggered. In response to the validation of the new data set, the new data set is selectively stored in a database for execution of an application as second role data. The database stores the second role data in association with the second role.

20 Claims, 7 Drawing Sheets

ROLE DATA SYNCHRONIZATION USING A SINGLE LOGICAL UNIT OF WORK

TECHNICAL FIELD

This disclosure relates generally to data processing and, in particular, to customer and vendor role data synchronization using a single logical unit of work.

BACKGROUND

Customer vendor integration (CVI) can be applied to synchronize customer and supplier data in a partner paradigm. The CVI process can help to prepare a complete data model of a customer and of a supplier. For example, a partner can be assigned a second role (e.g., a customer and/or a supplier role), which triggers the CVI process. After the CVI process is triggered, every change associated with one role (e.g., a partner role) gets synchronized to the associated role (e.g., customer and/or supplier role). Traditionally, the synchronization is performed using multiple (e.g., two) logical units of work (LUWs). The synchronization can include triggering a save function in the partner maintenance, including transferring the partner datasets to the database using update function modules, which are called in an update work process (update task). The synchronization can include committing the work, which can trigger the update function modules registered for an update task (saving the partner data into the database). The synchronization can include initiation of the partner outbound, which triggers the CVI process. Through the triggered CVI process, the partner data can be saved independently from the process that triggers the synchronization of data into customer and supplier databases. Errors during commit processing can result in a PPO entry, can lead to inconsistencies between partner data and customer data, and/or supplier data.

SUMMARY

In some implementations, the current subject matter relates to a computer implemented method for customer and vendor role data synchronization using a single logical unit of work. In one aspect, a system includes: at least one data processor; and at least one memory storing instructions, which when executed by the at least one data processor, cause operations including: processing a request to create a new data set, for a user, the new data set including general data compatible with a plurality of roles; receiving a selection of a first role of the plurality of roles to customize the new data set; determining that the user is associated with a second role; triggering an integration process including a validation of the new data set; and in response to the validation of the new data set, selectively storing the new data set in a database for execution of an application, the database storing second role data associated with the second role.

In some variations, one or more features disclosed herein including the following features can optionally be included in any feasible combination. In some implementations, the validation includes a mapping of the new data set to supplier data, a completeness verification of the new data set, and a test execution of the new data set. In some implementations, the preceding examples, wherein the validation generates an error of the new data set. In some implementations, the operations further include: displaying the error of the new data set; receiving a modification to the new data set; executing the validation of the new data set; and in response to successfully completing the validation of the new data set, storing the new data set in the database for execution of the application. In some implementations, creating the new data set includes adding general data and an address to a master template. In some implementations, the new data set includes a table structured format. In some implementations, the new data set includes database tables.

In another aspect, a computer-implemented method includes: processing, by one or more processors, a request to create a new data set, for a user, the new data set including general data compatible with a plurality of roles; receiving, by the one or more processors, a selection of a first role of the plurality of roles to customize the new data set; determining, by the one or more processors, that the user is associated with a second role; triggering, by the one or more processors, an integration process including a validation of the new data set; and in response to the validation of the new data set, selectively storing, by the one or more processors, the new data set in a database for execution of an application, the database storing second role data associated with the second role.

In some variations, one or more features disclosed herein including the following features can optionally be included in any feasible combination. In some implementations, the validation includes a mapping of the new data set to supplier data, a completeness verification of the new data set, and a test execution of the new data set. In some implementations, the preceding examples, wherein the validation generates an error of the new data set. In some implementations, the computer-implemented method further includes: displaying the error of the new data set; receiving a modification to the new data set; executing the validation of the new data set; and in response to successfully completing the validation of the new data set, storing the new data set in the database for execution of the application. In some implementations, creating the new data set includes adding general data and an address to a master template. In some implementations, the new data set includes a table structured format. In some implementations, the new data set includes database tables.

In another aspect, a non-transitory computer-readable storage medium includes programming code, which when executed by at least one data processor, causes operations including: processing a request to create a new data set, for a user, the new data set including general data compatible with a plurality of roles; receiving a selection of a first role of the plurality of roles to customize the new data set; determining that the user is associated with a second role; triggering an integration process including a validation of the new data set; and in response to the validation of the new data set, selectively storing the new data set in a database for execution of an application, the database storing second role data associated with the second role.

In some variations, one or more features disclosed herein including the following features can optionally be included in any feasible combination. In some implementations, the validation includes a mapping of the new data set to supplier data, a completeness verification of the new data set, and a test execution of the new data set. In some implementations, the preceding examples, wherein the validation generates an error of the new data set. In some implementations, the operations further include: displaying the error of the new data set; receiving a modification to the new data set; executing the validation of the new data set; and in response to successfully completing the validation of the new data set, storing the new data set in the database for execution of the application. In some implementations, creating the new data set includes adding general data and an address to a master template. In some implementations, the new data set includes a table structured format. In some implementations, the new data set includes database tables.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to customization of database tables, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
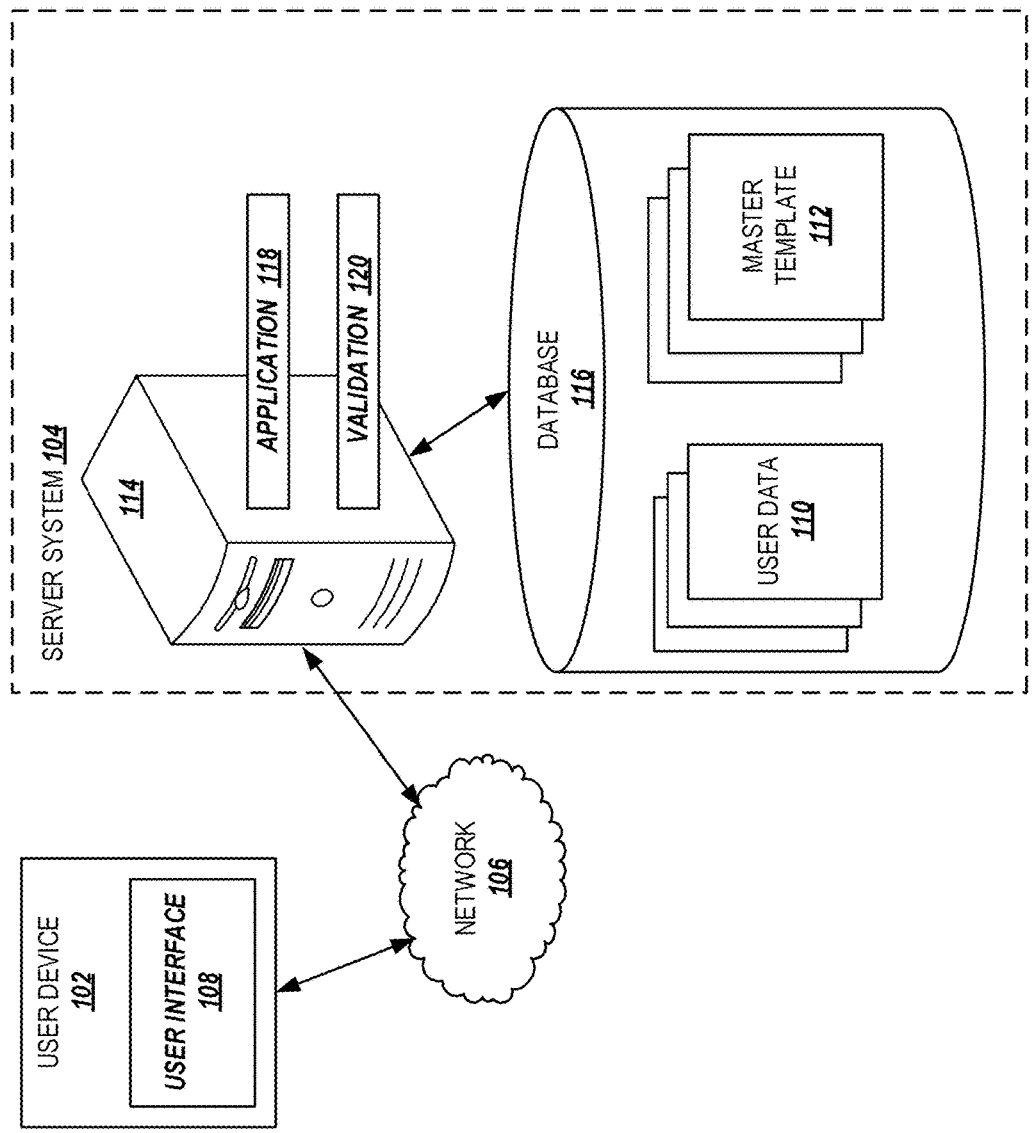
FIGS. 1A and 1B illustrate examples of a system, according to some implementations of the current subject matter.

When practical, like labels are used to refer to same or similar items in the drawings.

DETAILED DESCRIPTION

Implementations of the present disclosure are generally directed to customer and vendor role data synchronization using a single logical unit of work (LUW). More particularly, implementations of the present disclosure are directed to triggering a customer vendor integration (CVI) process along with secondary role data processing within a single LUW. Using a single LUW, requests to create a second role for a user registered as having a first role can trigger an integration process including a validation of the new role data to be stored. The validation process enables correction of errors identified in the new role data to ensure consistency with existing data and role rules. The new role data can be saved in a database, as second role data, for execution of an application configured to enable one or more actions corresponding to.

In traditional systems configured for creating and storing new role data that use a CVI process, the CVI synchronization includes another validation of data before initiating the inserts/updates/deletes to the database tables. If one of the validations fails, the system generates an error message and provides limited options to properly correct the source of the error message. One option includes a "rollback work" that leads to a consistent state between multiple roles (e.g., supplier, customer, and/or partner), but all changes that have been made can be lost. To avoid the loss of changes, a post processing office (PPO) tool can be used. If PPO is active in the system for synchronization direction partner to customer and/or partner to supplier, the update of customer and/or supplier can be suppressed and the validation errors that have prevented saving of customer and/or supplier can be logged in PPO. The users can check the PPO logs to correct the error that has occurred and re-insert the changes in the partner maintenance process, which can trigger additional issues when the data is used in execution of particular applications.

To avoid the inconsistencies between data corresponding to different roles, the CVI process can be adjusted to be integrated in a synchronization using a single LUW. In the implementations described herein, the single LUW can be configured to integrate customer, supplier and partner data. The CVI process tailored to the use of a single LUW can enable corrections of errors identified during validation and can discard the PPO tool. The use of the CVI process with a single LUW enables effective and consistent creation and update of the data customized for multiple different roles with decreased data footprint and increased system performance.

Figure 1B:
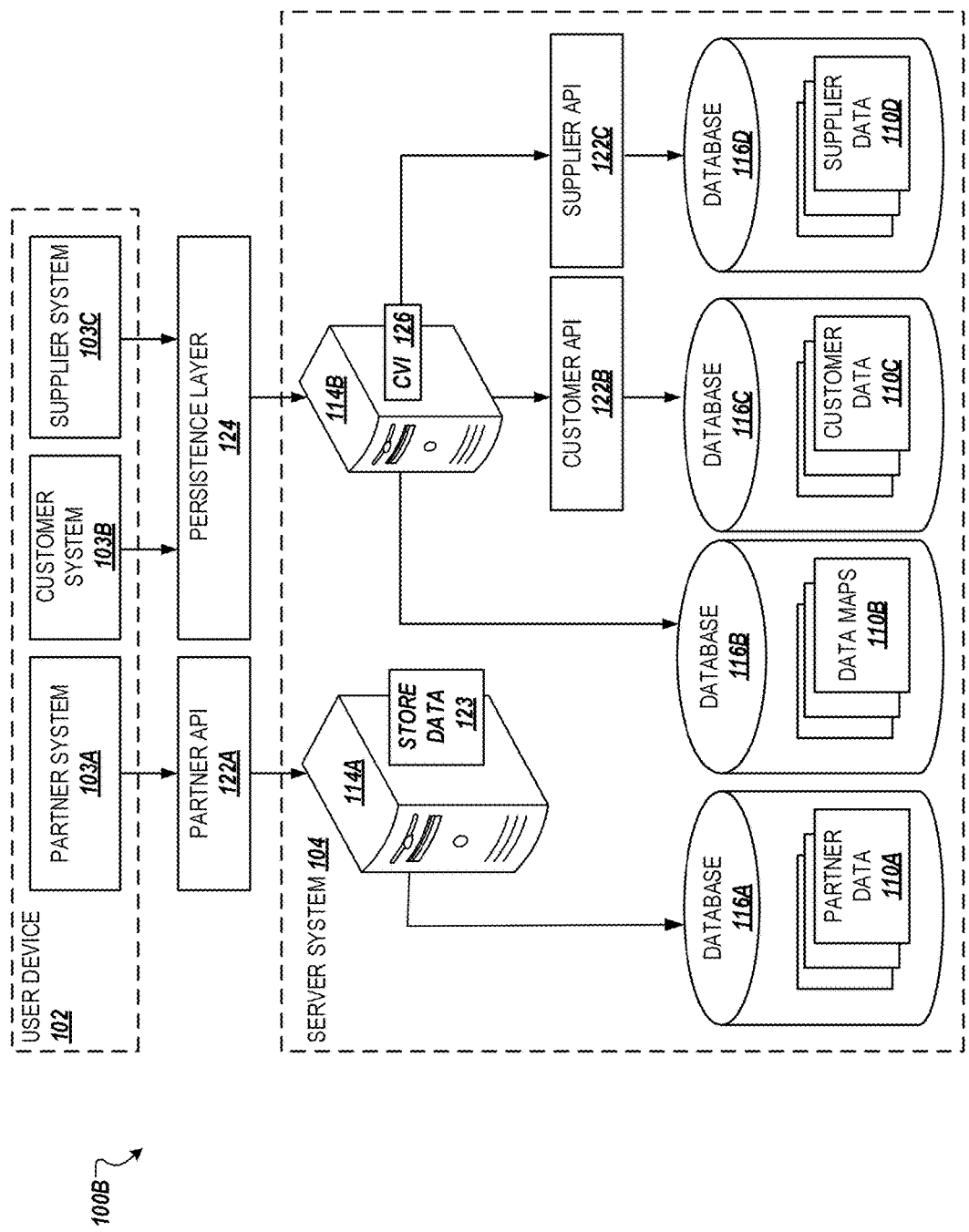

FIGS. 1A and 1B illustrate an example of systems for role data synchronization using a single LUW, according to some implementations of the current subject matter. FIG. 1A illustrates an example of system 100A for role data synchronization using a single LUW. The system 100A can include a user device 102, a server system 104, and a network 106. The user device 102 can interact with the server system 104 to request creation of data (e.g., product description, authorization checks, replication definitions, and/or product configuration formatted as tables including one or more fields) associated with a user role (e.g., supplier, customer, and/or partner) and to be stored and managed by the server system 104.

The user device 102 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. Even though, not illustrated, in some implementations, multiple user devices 102 including different computing system configurations, such as different operating systems, different processing capabilities, different hardware components, and/or other differences can concurrently request services, from the server system 104. The user device 102 can include any combination of fixed and variable computing components. The user device 102 can include a user interface 108 to enable an entry of a user input including a request to create user data 110 using a master template 112. As shown in FIG. 1A, the user device 102 can be communicatively coupled, via the network 106, with the server system 104 during an authenticated session to enable data creation and transmission to the server system 104 for accessing and managing data.

The server system 104 can include any form of servers including, but not limited to a web server (e.g., cloud-based server), an application server, a proxy server, a network server, and/or a server pool. In general, the server system 104 uses a data processing engine 114, a database 116. The data processing engine 114 can include one or more processors configured to perform operations related to handling of user data 110 (e.g., validations, translations, and/or data conversions). For example, the data processing engine 114 can include one or more processors configured to execute an application 118 to process user inputs, received from the user device 102, including a request to create user data 110 to be saved in the database 116, as tables with associated with a particular user role.

The database 116 can include a cloud database system environment, such as, Analytics Cloud (SAC) Data Warehouse Cloud or High performance Analytic Appliance (HANA), as available from SAP AG, Walldorf, Germany although other types of databases can be used as well. In some implementations, the database 116 can include an on-premise database system (e.g., system databases, tenant databases, etc.), servers (e.g., name server(s), index server(s), script server(s), etc.). The database 116 can include a runtime database that holds most recent user data 110 (including role specific data) to enable validated and trackable distribution processes of data. The database 116 can be include a multitenant database architecture (e.g., multitenant database containers (MDC)), such that each tenant of the server system 104 (using a respective user device 102) can customize user data 110 stored by the database 116 and can be served by separate portions of the server system 104. The database 116 can be configured to store the user data 110 and the master templates 112 in any format, such as a table format, column-row format, key-value format, etc. (e.g., each key can be indicative of various attributes and each corresponding value can be indicative of attribute's value). As can be understood, the user data 110 can be stored in any desired format, such as a text file including comma-separated values (csv file) having a format which allows data to be saved in a table structured format. The master templates 112 can include predefined static data that comply with a set of rules and can be displayed as logos and footers. The master templates 112 can be accessible, through the data processing engine 114, for generation of new user data 110. In some implementations, the database 116 can be implemented in various in-memory database systems, such as a High-Performance Analytic Appliance ("HANA") system as developed by SAP SE, Walldorf, Germany. Various systems, such as, enterprise resource planning ("ERP") system, supply chain management ("SCM") system, supplier relationship management ("SRM") system, customer relationship management ("CRM") system, and/or others, can interact with the in-memory system for the purposes of accessing data, for example. Other systems and/or combinations of systems can be used for implementations of the database 116.

The network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

Using the example system 100A, illustrated in FIG. 1A, a user accessing the user device 102 can access various processes/channels using one or more roles (e.g., as a partner, as a customer, and/or as a supplier), for which data creation and maintenance is supported by the server system 104. Each of the role associated data creation processes/channels follows a different design pattern. The example system 100A, illustrated in FIG. 1A, provides an overarching solution approach to create, validate, and correct user data 110 (e.g., data structured as tables) associated with a particular role before storing it in the database 116 using an efficient process (e.g., as described with reference to FIG. 5).

FIG. 1B illustrates an example of system 100B for role data synchronization using a single LUW. The system 100B can include a user device 102, a server system 104, and a network 106. The user device 102 can interact with the server system 104 to request creation of data (e.g., product description, authorization checks, replication definitions, and/or product configuration formatted as tables including one or more fields) associated with a user role (e.g., supplier, customer, and/or partner) and to be stored and managed by the server system 104.

The user device 102 can be configured as one or more of a partner system 103A, a customer system 103B, and a supplier system 103C. For example, a user of the user device 102 can provide a user input including a request to customize user data 110 according to a particular role corresponding to the partner system 103A, the customer system 103B, and the supplier system 103C. In some implementations, the partner system 103A is created when the customer system 103B or the supplier system 103C is created.

As shown in FIG. 1B, the user device 102 can be communicatively coupled (via the network 106) with a customer application programming interface (API) 122A. In some implementations, the data storage requests can be provided, by the partner system 103A, through the partner API 122A to the data processing engine 114A. The data processing engine 114A can use a storing application 123 to store, in the database 116A, newly created partner data 110A.

In some implementations, any of the customer system 103B and the supplier system can transmit newly created customer or supplier data 110C, 110D to a persistence layer 124 (e.g., a page buffer or other type of temporary persistency layer or a database extension layer) that transiently stores the data, while a CVI application 126 is executed by the data processing engine 114B. The CVI application 126 can include an interface that contains partner, customer, or vendor specific data 110A, 110C, 110D, at least a portion of the partner data 110A being redundant with the customer or vendor specific data. The customer data 110C or vendor specific data 110D can be routed through the data processing engine 114B, to be merged, by the CVI application 126, with partner data 110A. The CVI application 126 that is executed by the data processing engine 114B access data maps 110B stored by the database 116B to validate the customer data 110C or the supplier data 110D.

The outcome of the CVI application 126 can result in customer or supplier API calls 122B, 122C to the database 116B, 116C to store the validated customer data 110C or supplier data 110D. Even though the server system 104 is illustrated in FIG. 1B as including multiple database's 116A, 116B, 116C, 116D that each store a particular type of user data 110 associated with a particular user role of a selected system (e.g., the partner system 103A, the customer system 103B, or the supplier system 103C), a single database 116 (as illustrated in FIG. 1A) can store all types of user data 110A, 110C, 110D and the data maps 110B. The data maps 110B can be used for mapping of partner data 110A (e.g., common data between partner and customer or vendor data 110C, 110D, such as, Name, Address, Tax, Bank etc.) to customer or vendor data 110C, 110D. Further information about the mapping is provided with reference to FIG. 5.

Figure 2:
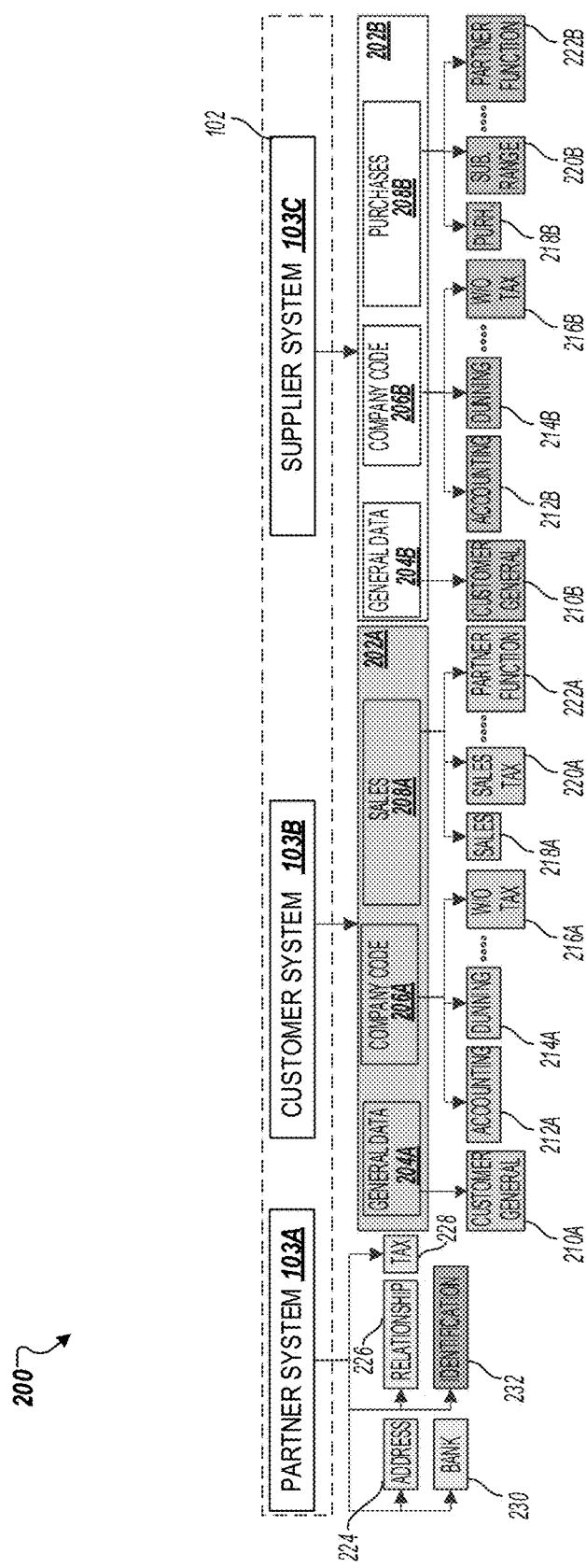
FIG. 2 illustrates an examples of role specific datasets, according to some implementations of the current subject matter.

FIG. 2 illustrates an example of a role specific data structure 200, according to some implementations of the current subject matter. The role specific data structure 200 can be created using the example systems 100A, 100B described with reference to FIGS. 1A and 1B.

The data corresponding to the partner system 103A, the customer system 103B, or the supplier system 103C can be structured in a way that simplifies the maintenance of master data as well as the associated processes, avoiding redundant storage. For example, central data 202A of the customer system 103B can include, for example, general data 204A, company code 206A, and sales 208A. The central data 202B of the supplier system 103C can include, for example, general data 204B, company code 206B, and purchasing 208C.

The general (role independent) data 204A of the customer system 103B can include, for example, customer general data 210A. The company code 206B of the customer system 103B can include, for example, accounting information 212A, dunning data 214A, tax data 216A, and other. The sales 208A of the customer system 103B can include, for example, sale information 218A, sale tax data 220A, partner function 222A, and other.

The general data 204A of the supplier system 103C can include, for example, customer general data 210B. The company code 206B of the supplier system 103C can include, for example, accounting information 212B, dunning data 214B, tax data 216B, and other. The purchases 208B of the supplier system 103C can include, for example, purchasing information 218B, sub-range data 220B, partner function 222B, and other.

The data corresponding to the partner system 103A can include, for example, address 224, relationship data 226 (defining relationship with the customer system 103B or the supplier system 103C), tax data 228, bank data 230, identification data 232, and other.

Figure 3:
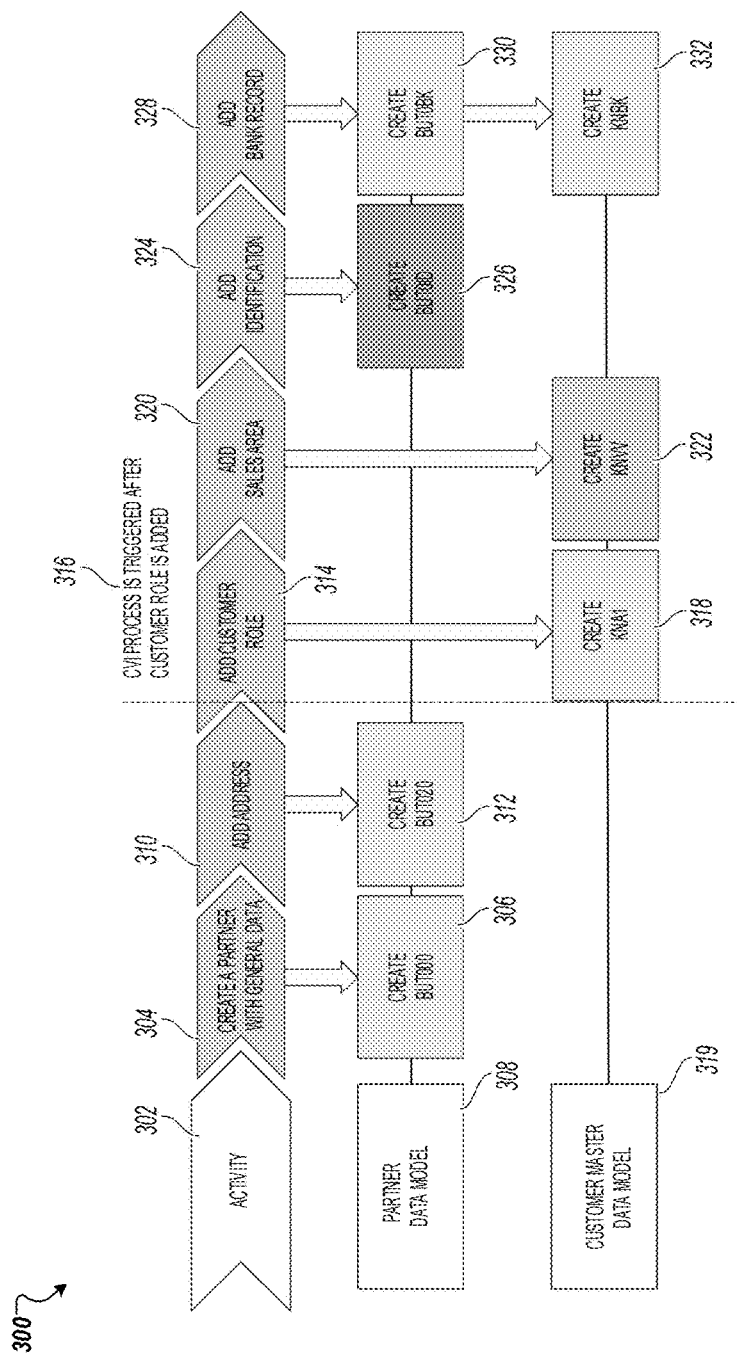
FIG. 3 illustrates an example of a CVI process, according to some implementations of the current subject matter.

FIG. 3 depicts an example process 300 for creating customer data and triggering partner data updates. The example process 300 can be executed using the example systems 100A, 100B described with reference to FIGS. 1A and 1B and/or example system 600 described with reference to FIG. 6.

The example process 300 can be initiated by an activity 302 including a user input including a request to generate a new data set. At 304, if the user who initiated the request is a new user, an empty partner data set 306 with general data fields is created using a partner data model 308. At 310, a request to add an address including address information can be received. In response to receiving the address information, an updated partner data set 312 including the address information generated. At 314, a request to add a customer role can be received. In response to receiving the identification of the customer role, at 316, a CVI process is triggered. The identification of the customer role can be used to generate a header table 318 of the customer using a customer master data model 319. At 320, a request to add sales area can be received. The sales area can be used to generate a database table 322. At 324, a request to add an identification can be received. The identification can be used to generate an updated partner data set 326. At 328, a request to add a bank record can be received. The bank record can be used to generate an updated partner data set 330 and an updated database table 332.

For example, the name and some further central attributes can be saved in database table BUT000 (e.g., header table of the partner object) for a partner, but in table KNA1/LFA1 for a customer/supplier (e.g., header tables of the customer/supplier objects). Payment transactions can be persisted in table BUT0BK for a partner and in tables KNBK/LFBK for a customer/supplier. For the already mentioned datasets as well as for some other common datasets like address data and tax data, the field values can be maintained at partner level and, when the partner can be saved, get transferred to the customer and supplier data model using an integration mechanism/tool of the CVI process.

Each of the roles (e.g., partner, customer, supplier, employee) can be associated to additional datasets that are unique to these roles. For example, customer and supplier roles have particular role specific datasets that are stored only in the customer and supplier data model. The particular role specific datasets are not part of the partner data model. Examples for particular role specific datasets can include company code dependent datasets of customer and supplier with header tables KNB1/LFB1. The partner dataset can include particular fields that are not available in customer or supplier datasets, for example identification numbers (table BUT0ID).

The example process 300 is further described with reference to an example scenario, where partner maintenance is done in a step-by-step approach, and it is shown how the partner and customer data models can be updated. BUT000, BUT020, BUT0BK, BUT0ID can be database tables of the partner data model. KNA1, KNVV, KNBK can be the database tables of the customer data model. As shown in FIG. 3, in response to a partner being created with some general data and an address, new partner table entries can be created in tables BUT000 and BUT020. As soon as a customer-specific role is added the CVI process is triggered and data is created in the customer data model. In response to customer being created, all the common data gets synchronized from the partner to the customer. The payment transactions is one of the common datasets. In response to a payment transaction being added, an entry in the partner database table BUT0BK is created. In response to saving the newly created data during synchronization, the entry is mapped to the format of the customer database table KNBK and can be created in database as well. In response to sales area data being added in the partner data set, an entry in database table KNVV can be created and the partner data model remains unmodified. In response to identification numbers being added, a database entry is created only in the partner data model (e.g., table BUT0ID. No change happens on the customer master end).

Figure 4:
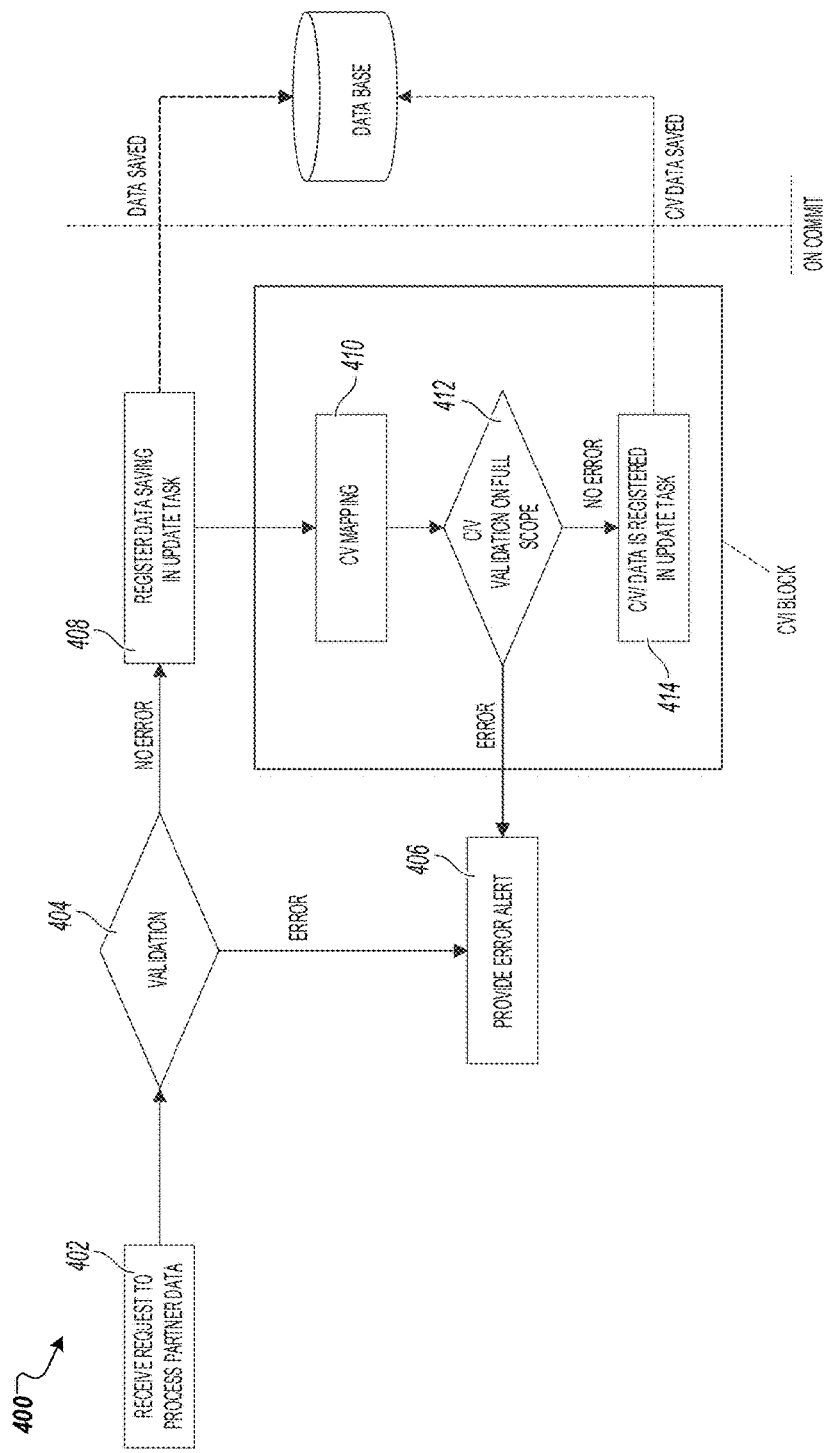
FIG. 4 illustrates an example of a CVI flow, according to some implementations of the current subject matter.

FIG. 4 shows an example process 400 for saving newly created customer data. The example process 400 can be executed using the customer data generated using the example process 300 described in FIG. 3. The example process 400 can be executed using the example systems 100A, 100B described with reference to FIGS. 1A and 1B, the example system 600 described with reference to FIG. 6 or any combination thereof.

The example process 400 can be initiated, at 402, by a request to process (e.g., newly created partner) data. At 404, the (partner) data can be validated. In response to identifying an error, during the validation process, at 406, an error alert is provided (displayed) to a user of a user device. In response to successful validation (identifying no error), at 408, data saving is registered in an update task for saving the data in a database (e.g., database 116A-D described with reference to FIGS. 1A and 1B). At 410, customer vendor mapping is called to identify the customer vendor data. At 412, a verification of the full scope is performed using the customer vendor mapping. In response to successful verification (identifying no error), at 414, mapped customer vendor data is sent to the database for saving.

Figure 5:
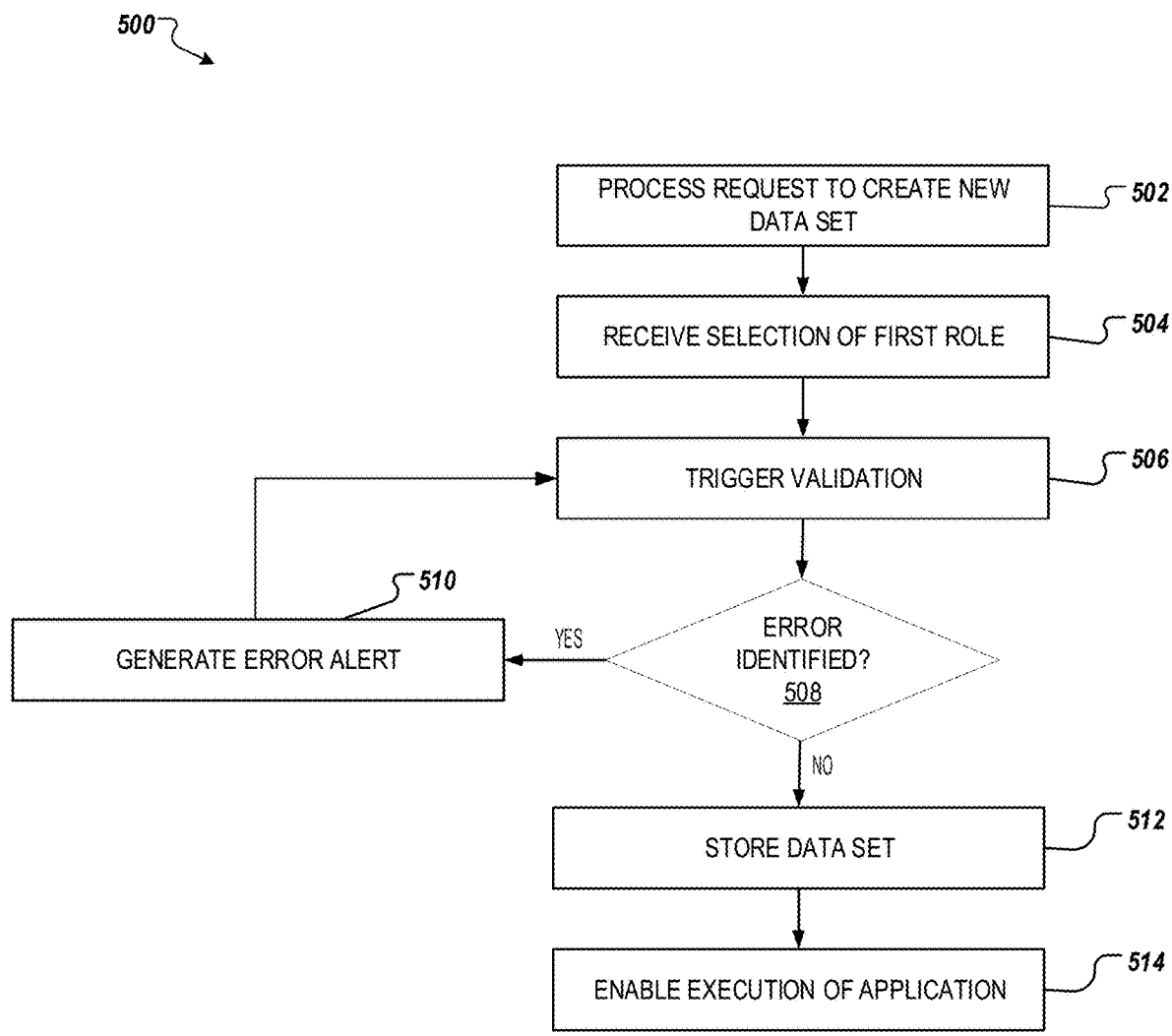
FIG. 5 illustrates an example of a process, according to some implementations of the current subject matter.

FIG. 5 depicts a flowchart illustrating a process 500 for managing artifact related metadata in accordance with some example implementations. The process 500 can be executed by the example systems 100A, 100B described with reference to FIGS. 1A and 1B, the example system 600 described with reference to FIG. 6 or any combination thereof.

At 502, a request to create general data, for a user, is received, by a data processing system (e.g., data processing engine 114 described in FIG. 1A). The first role data can include general data associated with the user (e.g., user name, contact information) that is compatible with multiple roles (e.g., customer, supplier/vendor, or partner). The general data can be used to generate an associated partner data set using a partner data retrieved from a database, the partner data set including the general data.

At 504, a selection of a first role of the multiple roles is received to customize the new data set. For example, a user input is received as a request to add one of the displayed category of roles of users enabled to create new data sets. In some implementations, in response to receiving the selection of the first role (e.g., customer), it is determined whether the user is also registered using a second role (e.g., vendor), different than the first role.

At 506, an integration process is triggered. The integration process includes a validation of the new data set. For example, the general data can be used to generate a header table of the customer using a customer master data model. During the validation of the new data set role particular data (e.g., sale category, accounting, dunning, taxes, bank record, etc.) and an identification can be received. The role particular data can be used to fill the fields of a database table generated based on a role particular master data model. The identification can be used to update the associated partner data set. The validation of the new data set formatted as a database table with filled fields can be performed using a customer vendor mapping that verifies that each of the field entries is correct using one or more rules, a completeness verification of the new data set, and a test execution of the new data set. The rules can define the conditions applied for verification of the data type and data ranges for each filled field. The validation can include checks based on one or more criteria that can include character restrictions (only valid characters can be included), range restrictions, and value specifications. During the validation it can be determined if the relevant portions of the data matches the rule set of the respective namespace corresponding to the selected role. For example, validation can ensure that the definitions are done identically for relevant portions of the data retrieved from corresponding tables. The validation can be performed by a general-purpose validation framework (e.g., data processing engine 114 described with reference to FIG. 1A) that checks for consistency and plausibility based on semantic validation.

At 508, it is determined whether the validation result includes an identification of an error in the new data set formatted as a database table. An error can include a value outside a range, a missing value, an incorrectly formatted value, etc. At 510, in response to determining that the validation result includes an identification of one or more errors in the new data set formatted as a database table, an alert indicating the identified one or more errors is generated and is provided for display. The alert can include instructions, recommendations, or suggestions for remedying the identified one or more errors that can be corrected to generate an updated data set that can be revalidated.

At 512, in response to determining that the validation result indicates that the (new or corrected) data set formatted as a database table request is free of errors, the data set is set to a database for storage as second role data that is associated with the second role.

At 514, execution of an application is enabled by using the stored data set. For example, a portion of the data set can be retrieved from the database, using data identifiers to execute the application formatted according to the first role or a second role based on the association with the first role or the second role. In some implementations, a unique identifier for the text can be used as a key of an object (e.g., JSON object) to identify a particular text. In some implementations, determining the relevant portions of the data includes determining a selected role, associated with each of the relevant portions of the data.

The example process 500 enables optimization of role based data creation and validation, providing access to created data for updates. The described implementations of the example process 500 can be implemented by using a single LUW that provides mapping between different role data. The example process 500 ensures consistencies between a first role content and corresponding partner data, without increasing the data storage requirements. The use of single LUW in the example process 500 enables secure, effective, and consistent generation and updates of the data.

Figure 6:
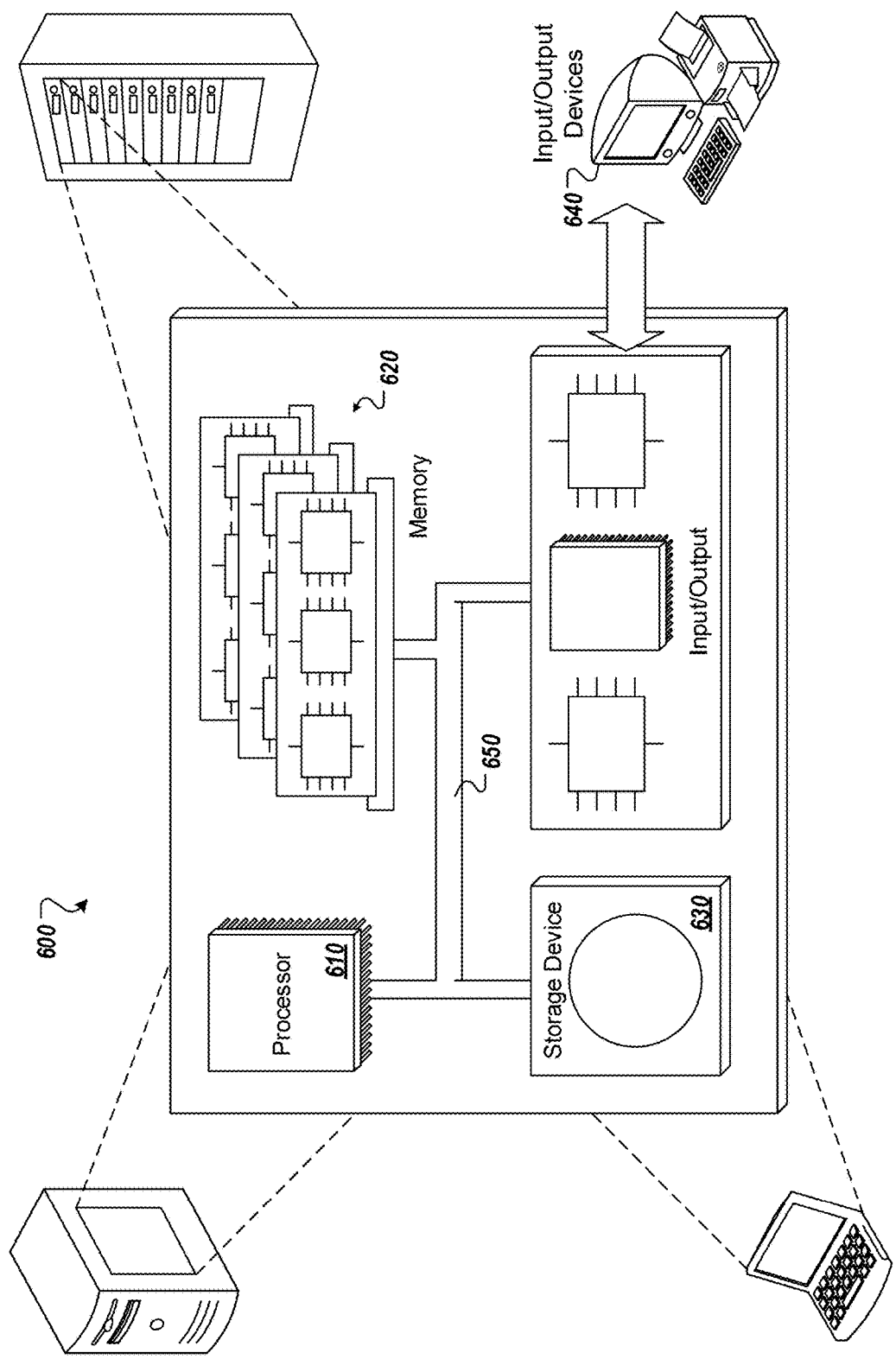
FIG. 6 illustrates an example of a computing system diagram, in accordance with some example implementations.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A system comprising: at least one data processor; and at least one memory storing instructions, which when executed by the at least one data processor, cause operations comprising: processing a request to create a new data set, for a user, the new data set comprising general data compatible with a plurality of roles; receiving a selection of a first role of the plurality of roles to customize the new data set; determining that the user is associated with a second role; triggering an integration process comprising a validation of the new data set; and in response to the validation of the new data set, selectively storing the new data set in a database for execution of an application, the database storing second role data associated with the second role.

Example 2: The system of example 1, wherein the validation comprises a mapping of the new data set to supplier data, a completeness verification of the new data set, and a test execution of the new data set.

Example 3: The system of the preceding examples, wherein the validation generates an error of the new data set.

Example 4: The system of the preceding examples, wherein the operations further comprise: displaying the error of the new data set; receiving a modification to the new data set; executing the validation of the new data set; and in response to successfully completing the validation of the new data set, storing the new data set in the database for execution of the application.

Example 5: The system of the preceding examples, wherein creating the new data set comprises adding general data and an address to a master template.

Example 6: The system of any one of the preceding examples, wherein the new data set comprises a table structured format.

Example 7: The system of any one of the preceding examples, wherein the new data set comprises database tables.

Example 8: A computer-implemented method comprising: processing, by one or more processors, a request to create a new data set, for a user, the new data set comprising general data compatible with a plurality of roles; receiving, by the one or more processors, a selection of a first role of the plurality of roles to customize the new data set; determining, by the one or more processors, that the user is associated with a second role; triggering, by the one or more processors, an integration process comprising a validation of the new data set; and in response to the validation of the new data set, selectively storing, by the one or more processors, the new data set in a database for execution of an application, the database storing second role data associated with the second role.

Example 9: The computer-implemented method of example 8, wherein the validation comprises a mapping of the new data set to supplier data, a completeness verification of the new data set, and a test execution of the new data set.

Example 10: The computer-implemented method of any one of the preceding examples, wherein the validation generates an error of the new data set.

Example 11: The computer-implemented method of any one of the preceding examples, further comprising: displaying, by the one or more processors, the error of the new data set; receiving, by the one or more processors, a modification to the new data set; executing, by the one or more processors, the validation of the new data set; and in response to successfully completing the validation of the new data set, storing, by the one or more processors, the new data set in the database for execution of the application.

Example 12: The computer-implemented method of any one of the preceding examples, wherein creating the new data set comprises adding general data and an address to the master template.

Example 13: The computer-implemented method of any one of the preceding examples, wherein the new data set comprises a text file with a table structured format.

Example 14: The computer-implemented method of any one of the preceding examples, wherein the new data set comprises database tables.

Example 15: A non-transitory computer-readable storage medium comprising programming code, which when executed by one or more processors, causes operations comprising: processing a request to create a new data set, for a user, the new data set comprising general data compatible with a plurality of roles; receiving a selection of a first role of the plurality of roles to customize the new data set; determining that the user is associated with a second role; triggering an integration process comprising a validation of the new data set; and in response to the validation of the new data set, selectively storing the new data set in a database for execution of an application, the database storing second role data associated with the second role.

Example 16: The non-transitory computer-readable storage medium of example 15, wherein the validation comprises a mapping of the new data set to supplier data, a completeness verification of the new data set, and a test execution of the new data set.

Example 17: The non-transitory computer-readable storage medium of any one of the preceding examples, wherein the validation generates an error of the new data set.

Example 18: The non-transitory computer-readable storage medium of any one of the preceding examples, wherein the operations further comprise: displaying the error of the new data set; receiving a modification to the new data set; executing the validation of the new data set; and in response to successfully completing the validation of the new data set, storing the new data set in the database for execution of the application.

Example 19: The non-transitory computer-readable storage medium of any one of the preceding examples, wherein creating the new data set comprises adding general data and an address to a master template.

Example 20: The non-transitory computer-readable storage medium of any one of the preceding examples, wherein the new data set comprises a table structured format or database tables.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system comprising:
at least one data processor; and
at least one memory storing instructions, which when executed by the at least one data processor, cause operations comprising:
processing a request to create a new data set, for a user, the new data set comprising general data compatible with a plurality of roles;
receiving a selection of a first role of the plurality of roles to customize the new data set;
determining that the user is associated with a second role in response to receiving the selection of the first role, wherein the second role is different than the first role;
triggering an integration process comprising a validation of the new data set in response to determining that the user is associated with the second role, wherein the validation comprises, by a single logical unit of work, a mapping of the new data set to supplier data and determining that the data set is free of errors;

selectively storing the new data set as second role data associated with the second role in a database for execution of an application in response to the validation of the new data set and by the single logical unit of work; and executing the application using the stored new data set, the executing comprising retrieving a portion of the new data set from the database formatted according to the first role or the second role using data identifiers to execute the application.

2. The system of claim 1, wherein the validation further comprises: a completeness verification of the new data set and a test execution of the new data set.

3. The system of claim 2, wherein the validation generates an error of the new data set.

4. The system of claim 3, wherein the operations further comprise:

displaying the error of the new data set;
receiving a modification to the new data set;
executing the validation of the new data set; and
in response to successfully completing the validation of the new data set, storing the new data set in the database for execution of the application.

5. The system of claim 4, wherein creating the new data set comprises adding the general data and an address to a master template.

6. The system of claim 1, wherein the new data set comprises a table structured format.

7. The system of claim 1, wherein the new data set comprises database tables.

8. A computer-implemented method comprising:

processing, by one or more processors, a request to create a new data set, for a user, the new data set comprising general data compatible with a plurality of roles;

receiving, by the one or more processors, a selection of a first role of the plurality of roles to customize the new data set;

determining, by the one or more processors, that the user is associated with a second role in response to receiving the selection of the first role, wherein the second role is different than the first role;

triggering an integration process comprising a validation of the new data set in response to determining that the user is associated with the second role, wherein the validation comprises, by a single logical unit of work, a mapping of the new data set to supplier data and determining that the data set is free of errors;

selectively storing the new data set as second role data associated with the second role in a database for execution of an application in response to the validation of the new data set and by the single logical unit of work; and executing the application using the stored new data set, the executing comprising retrieving a portion of the new data set from the database formatted according to the first role or the second role using data identifiers to execute the application.

9. The computer-implemented method of claim 8, wherein the validation further comprises: a completeness verification of the new data set and a test execution of the new data set.

10. The computer-implemented method of claim 8, wherein the validation generates an error of the new data set.

11. The computer-implemented method of claim 10, further comprising:

displaying, by the one or more processors, the error of the new data set;
receiving, by the one or more processors, a modification to the new data set;
executing, by the one or more processors, the validation of the new data set; and
in response to successfully completing the validation of the new data set, storing, by the one or more processors, the new data set in the database for execution of the application.

12. The computer-implemented method of claim 11, wherein creating the new data set comprises adding the general data and an address to a master template.

13. The computer-implemented method of claim 8, wherein the new data set comprises a text file with a table structured format.

14. The computer-implemented method of claim 8, wherein the new data set comprises database tables.

15. A non-transitory computer-readable storage medium comprising programming code, which when executed by one or more processors, causes operations comprising:

processing a request to create a new data set, for a user, the new data set comprising general data compatible with a plurality of roles;

receiving a selection of a first role of the plurality of roles to customize the new data set;

determining that the user is associated with a second role in response to receiving the selection of the first role, wherein the second role is different than the first role;

triggering an integration process comprising a validation of the new data set in response to determining that the user is associated with the second role, wherein the validation comprises, by a single logical unit of work, a mapping of the new data set to supplier data and determining that the data set is free of errors;

selectively storing the new data set as second role data associated with the second role in a database for execution of an application in response to the validation of the new data set and by the single logical unit of work; and executing the application using the stored new data set, the executing comprising retrieving a portion of the new data set from the database formatted according to the first role or the second role using data identifiers to execute the application.

16. The non-transitory computer-readable storage medium of claim 15, wherein the validation further comprises: a completeness verification of the new data set and a test execution of the new data set.

17. The non-transitory computer-readable storage medium of claim 16, wherein the validation generates an error of the new data set.

18. The non-transitory computer-readable storage medium of claim 17, wherein the operations further comprise:

displaying the error of the new data set;
receiving, by the one or more processors, a modification to the new data set;
executing the validation of the new data set; and
in response to successfully completing the validation of the new data set, storing the new data set in the database for execution of the application.

19. The non-transitory computer-readable storage medium of claim 18, wherein creating the new data set comprises adding the general data and an address to a master template.

20. The non-transitory computer-readable storage medium of claim 15, wherein the new data set comprises a table structured format or database tables.

\* \* \* \* \*